(12) United States Patent
Hung

(10) Patent No.: US 7,516,268 B2
(45) Date of Patent: Apr. 7, 2009

(54) METHOD FOR IMPROVING WRITING DATA EFFICIENCY AND STORAGE SUBSYSTEM AND SYSTEM IMPLEMENTING THE SAME

(75) Inventor: Ching-Hai Hung, Yonghe (TW)

(73) Assignee: Infortrend Technology, Inc., Taipei Hsien (TW)

(*) Notice: Subject to any disclaimer, the term of this patent is extended or adjusted under 35 U.S.C. 154(b) by 341 days.

(21) Appl. No.: 11/495,513

(22) Filed: Jul. 31, 2006

(65) Prior Publication Data
US 2007/0028045 A1    Feb. 1, 2007

Related U.S. Application Data

(60) Provisional application No. 60/595,741, filed on Aug. 1, 2005.

(51) Int. Cl.
*G06F 12/00* (2006.01)

(52) U.S. Cl. .......................... 711/103; 711/112

(58) Field of Classification Search ................ 711/104, 711/105, 112, 114
See application file for complete search history.

(56) References Cited

U.S. PATENT DOCUMENTS 5,083,266 A * 1/1992 Watanabe .................. 713/601
5,655,150 A   8/1997 Matsumoto et al.
2005/0066124 A1 3/2005 Horn et al.
2007/0028045 A1* 2/2007 Hung ......................... 711/114

FOREIGN PATENT DOCUMENTS

| EP | 0 497 067 A1 | 8/1992 |
|----|--------------|--------|
| EP | 0 936 534 A2 | 8/1999 |
| EP | 1 168 173 A2 | 1/2002 |
| WO | WO-02/091111 A2 | 11/2002 |

* cited by examiner

*Primary Examiner*—Brian R Peugh
(74) *Attorney, Agent, or Firm*—Muncy, Geissler, Olds & Lowe, PLLC

(57) ABSTRACT

The invention relates to a method, a storage subsystem and system for improving data writing efficiency. When writing data, if a predetermined N number of data or fewer than the predetermined N number of data are yet written after waiting a specific time period, the data writing I/O request is regarded as completed. The corresponding resources are then released. The N number of yet written data and the related writing information are stored in a non-volatile memory (NVRAM), so that when there is a sudden power cut or power failure happens that interrupts the data writing, the process can be resumed after the power supply is turned back on.

37 Claims, 13 Drawing Sheets

METHOD FOR IMPROVING WRITING DATA EFFICIENCY AND STORAGE SUBSYSTEM AND SYSTEM IMPLEMENTING THE SAME

RELATED APPLICATIONS

This application claims priority to provisional patent application Ser. No. 60/595,741, filed Aug. 1, 2005, and entitled "Method For Improving Writing Data Efficiency And Storage Subsystem And System Implementing The Same", which is incorporated herein by reference.

BACKGROUND OF THE INVENTION

1. Field of the Invention

The invention relates to a data writing method and, in particular, to a method for improving data writing efficiency of a storage system.

2. Related Art

A conventional redundant array of inexpensive disks (RAID) is schematically shown in FIG. 1A. It includes a host 11, a controller 12, and a physical disk drive array 13. The physical disk drive array 13 has several disk drives D1, D2, D3, and D4. The host 11 is coupled to the controller 12, which is then coupled to the disk drives D1, D2, D3, and D4. The host 11 accesses data in the disk drives D1, D2, D3, and D4 via the controller 12. The controller 12 usually temporarily stores data, which is received from the host 11 (e.g., data W1 and W2) and waiting to be written, in its cache unit 121. Afterwards, the waiting-to-be-written data are read from the cache unit 121 and written into the corresponding target disk drives (e.g., disk drives D1 and D2).

FIG. 1B is a flowchart showing the action of writing data from the cache unit to a storage medium in prior art. It takes RAID level 5 as an example, for whose description please refer to FIG. 1A simultaneously. Suppose that the target written blocks of data W1 and W2 belong to the same stripe. When data W1 and W2 are going to be read from the cache unit 121 of the controller 12 to the target disk drives D1 and D2 (step S100), the controller 12 first computes a new parity data P1 associated with data W1 and W2 (step S102) and stores a parity updating log in the cache unit 121 or another non-cache unit (not shown). The parity updating log records the stripe information of where data W1 and W2 are located, provided for consistency corrections of parity data after the power is turned back on if the data are not completely written into the disk drives due to a power cut or power failure (step S105).

Afterwards, the controller 12 writes data W1, W2 along with the new parity data P1 to the target disk drives D1, D2, and D4 (step S110). If data W1, W2 and the new parity data P1 are successfully written into the corresponding target disk drives D1, D2, and D4, the controller deletes the previously stored parity updating log (step S115). A writing completion message is then returned to the host 11 (step S120).

However, data may not be able to be written to completion rapidly in certain situations. For example, if one of the disk drives D2 is performing a read request and the read request cannot be completed for a while, the succeeding write request associated with the written data W2, sent by the controller 12 to the disk drive D2, may stay waiting in the queue all the time and cannot be performed. Even if other data write requests have been completed, the controller 12 will still stay waiting and cannot return a writing completion message to the host 11 until the completion of the write request for writing data W2. At the time all the related data W1, W2, P1 and the parity updating log will also keep occupying the limited memory space. When the data in the memory space are not released all along, no more memory space can be spared to receive new data. As this stripe being currently updated cannot finish the writing process, it is impossible to turn in another write request for the stripe. In some cases, some disk drives may run with a slower speed while accessing data on certain blocks, or the disk drive is retrying a read request so that no write request can be processed temporarily. The data being re-read may be able to be generated from other related data. However, the data of the write request have to be actually written into the target disk drive to completion. Therefore, the controller 12 has to keep waiting until the disk drives with a lower access speed complete the write request, and then return a writing completion message to the host 11, followed by the process of deleting data stored in the cache unit 121 and their parity updating log.

Although the above-mentioned RAID techniques can combine smaller physical disk drives into a logic medium unit of a larger capacity, higher tolerance, and better efficiency for a host system to use, further enhancing the processing efficiency of the storage system is still one of the most important issues in the field.

SUMMARY OF THE INVENTION

An objective of the invention is to enhance the efficiency of storage systems. To achieve the above objective, the invention improves the data writing method. According to the invention, the disclosed data writing method for a storage system is performed by a first controller in order to deal with a data writing I/O request issued by an application I/O request unit, the method comprising: sending at least one physical storage medium write request to a physical storage medium array; examining whether a writing completion judgment condition is satisfied or not; and regarding the data writing I/O request as completed and releasing the resources corresponding to the completed one(s) of the at least one physical storage medium write request and the resources used by the data writing I/O request if the previous examining result is yes; wherein, the written data and the related writing information of the uncompleted one(s) of the at least one physical storage medium write request are stored in a memory and will be deleted after the write request is completed.

The invention further provides a storage system that includes: an application I/O request unit used to issue a data writing I/O request; a first controller coupled to the application I/O request unit; and at least one physical storage medium array coupled to the first controller and used to provide storage space to the application I/O request unit through the first controller; wherein the first controller sending at least one physical storage medium write request to the physical storage medium array owing to the data writing I/O request, regarding the data writing I/O request as completed when a writing completion judgment condition is satisfied, storing the written data and the related writing information of the uncompleted one(s) of the at least one physical storage medium write request in a memory, and releasing the resources corresponding to the completed one(s) of the at least one physical storage medium write request and the resources used by the data writing I/O request.

Moreover, the invention provides a storage subsystem that includes: a first controller; and at least one physical storage medium array coupled to the first controller; wherein when the first controller sends at least one physical storage medium write request to the physical storage medium array and a writing completion judgment condition is satisfied, a data writing I/O request from an application I/O request unit is regarded as completed, and then the written data and the related writing information of the uncompleted one(s) of the at least one physical storage medium write request are stored in a memory and the resources corresponding to the completed one(s) of the at least one physical storage medium write request and the resources used by the data writing I/O request are released.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

The invention improves data writing efficiency. In a storage system, a writing completion judgment condition is set in advance. For a write request in the storage system, the writing completion judgment condition will be examined if the write request needs to write several data sets to storage devices. When the writing completion judgment condition is satisfied, the write request is regarded as completed, and then a writing completion message is replied to an application I/O request unit and the corresponding resources are released, thereby improving the efficiency of the entire system. Besides, the storage medium suitable for being written data in the invention can be a tape, disk drive, memory, optical storage medium, or other equivalent storage device.

Figure 1A:
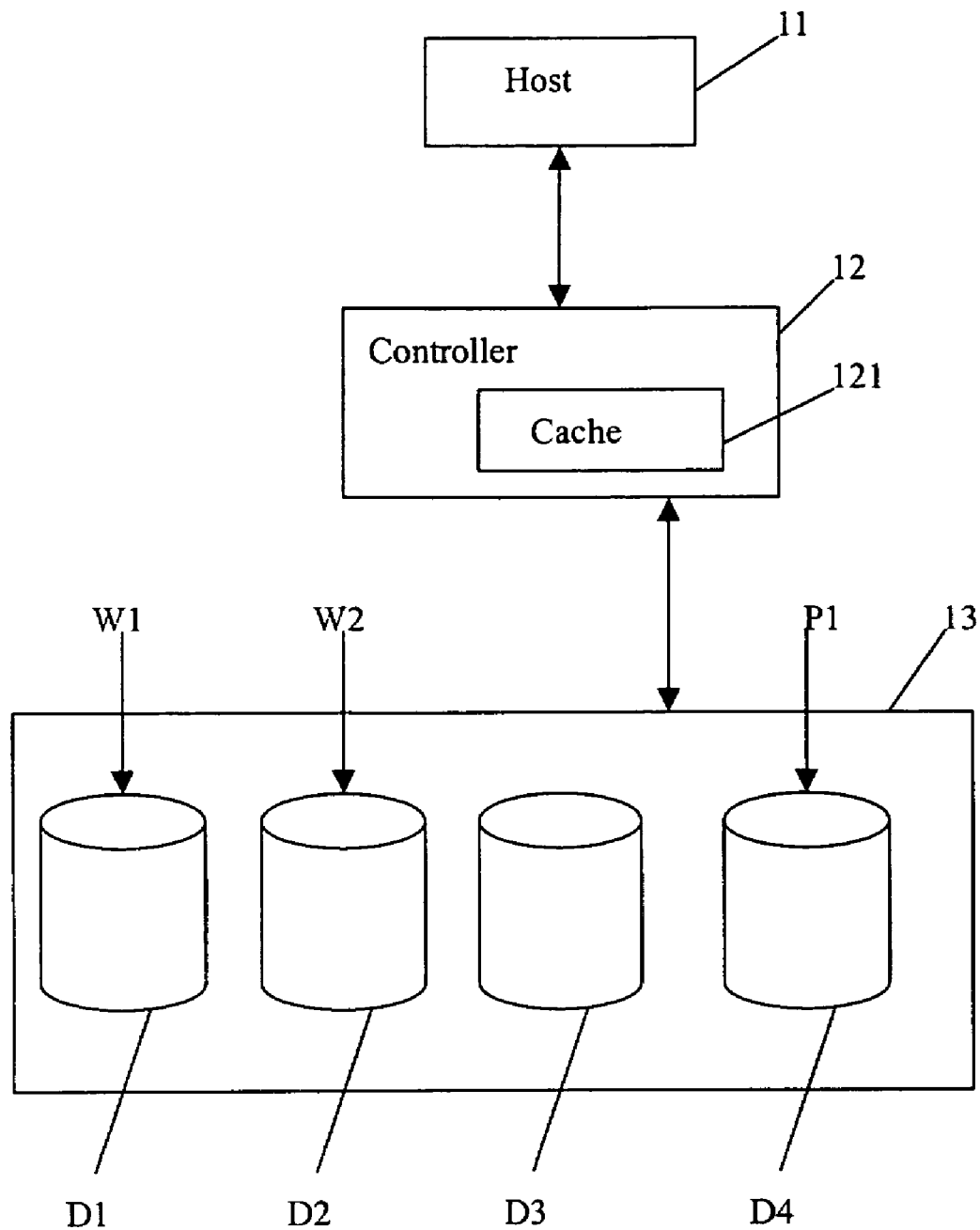
FIG. 1A is a schematic view of a conventional storage system.
Figure 1B:
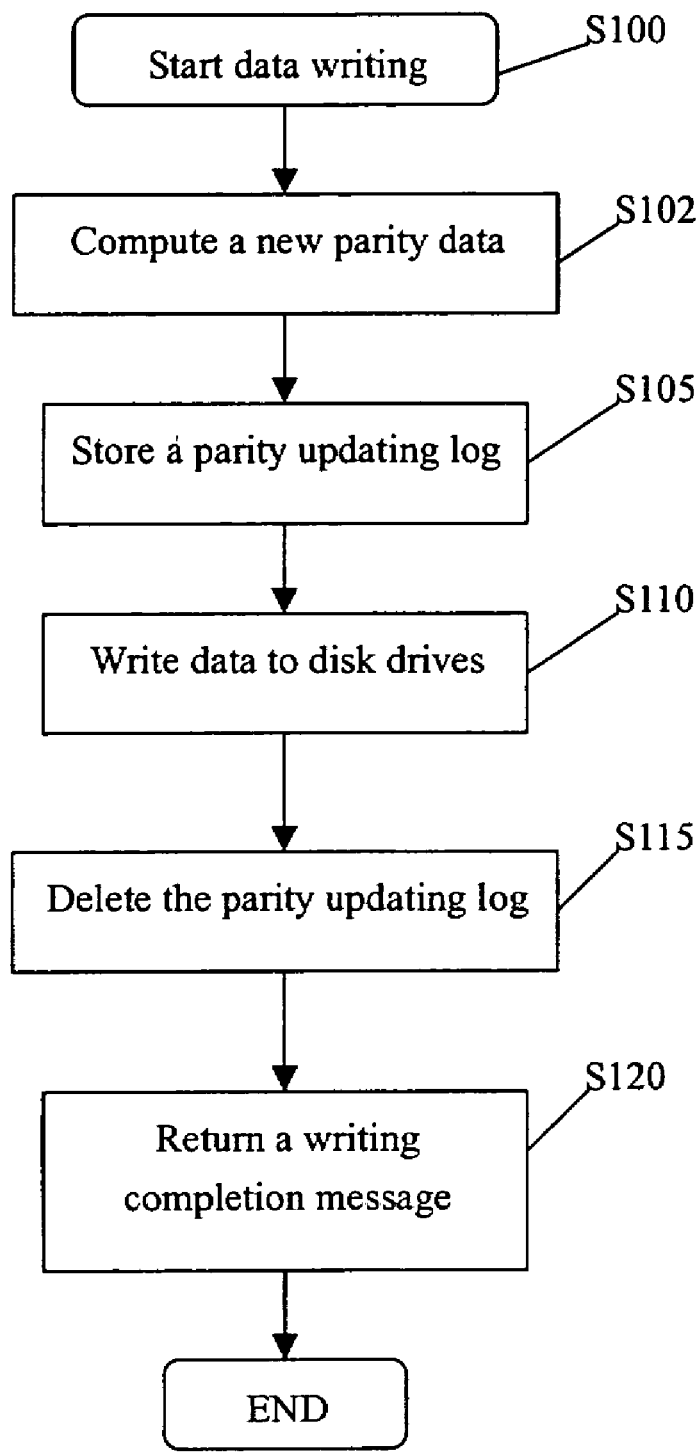
FIG. 1B is a flowchart of the conventional data writing method.
Figure 2:
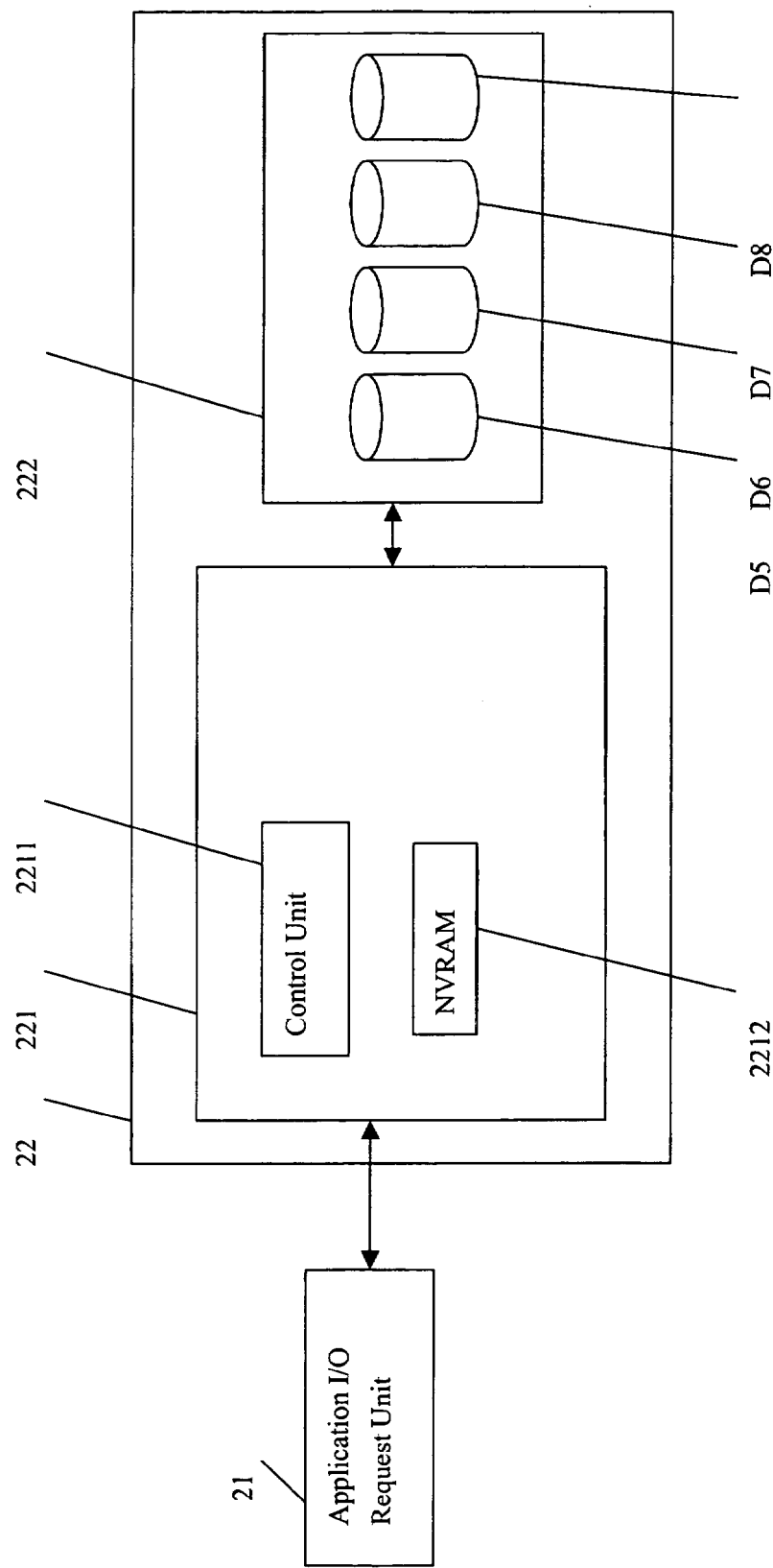
FIG. 2 is a schematic view of the system structure of the invention.

As shown in FIG. 2, a preferred embodiment of the storage system includes an application I/O request unit 21 and a storage subsystem 22. The application I/O request unit 21 can be a host or an application device needing to write data to the storage subsystem 22. The storage subsystem 22 includes a controller 221 and a physical disk drive array 222. The controller 22 has a control unit 2211 and a non-volatile RAM (NVRAM) 2212. The NVRAM 2212 can generally include the kind of memory equipped with a battery backup unit (BBU) or the memory that can keep its data even when the power of the controller 22 is turned off or failed. The above-mentioned physical disk drive array 222 has several disk drives D5, D6, D7, and D8. The physical disk drive array 222 may have 8, 16, 32, or other number of disk drives.

When the application I/O request unit 21 is a host, it can be connected via a storage area network (SAN), Ethernet (LAN) or serial ATA (SATA), fiber channel (FC), small computer system interface (SCSI), PCI Express, or serial-attached SCSI (SAS) I/O interface, etc. In some cases, the application I/O request unit 21 can be an application specific integrated circuit (ASIC) or other equivalent device that can send out data writing I/O requests, both of which are capable of sending out data writing I/O requests to the controller 221 according to the commands from some other devices so as to write data to the physical disk drive array 222 via the controller 221.

The controller 221 and the physical disk drive array 222 of the storage subsystem 22 can be disposed together in an enclosure or independently in different enclosures. Moreover, the application I/O request unit 21 can also be disposed with the storage subsystem 22 in the same enclosure. The controller 221 can be coupled to the disk drives D5, D6, D7, and D8 via a serial-attached SCSI (SAS), SCSI, SATA, PATA (IDE), or fiber channel (FC) transmission interface. Therefore, the disk drives D5, D6, D7, and D8 can be SAS, SCSI, SATA, PATA (IDE), or FC disk drives. The controller 221 can be a RAID controller. The RAID technology generally refers to RAID level 0 to 6 and their extensions and combinations.

Figure 3A:
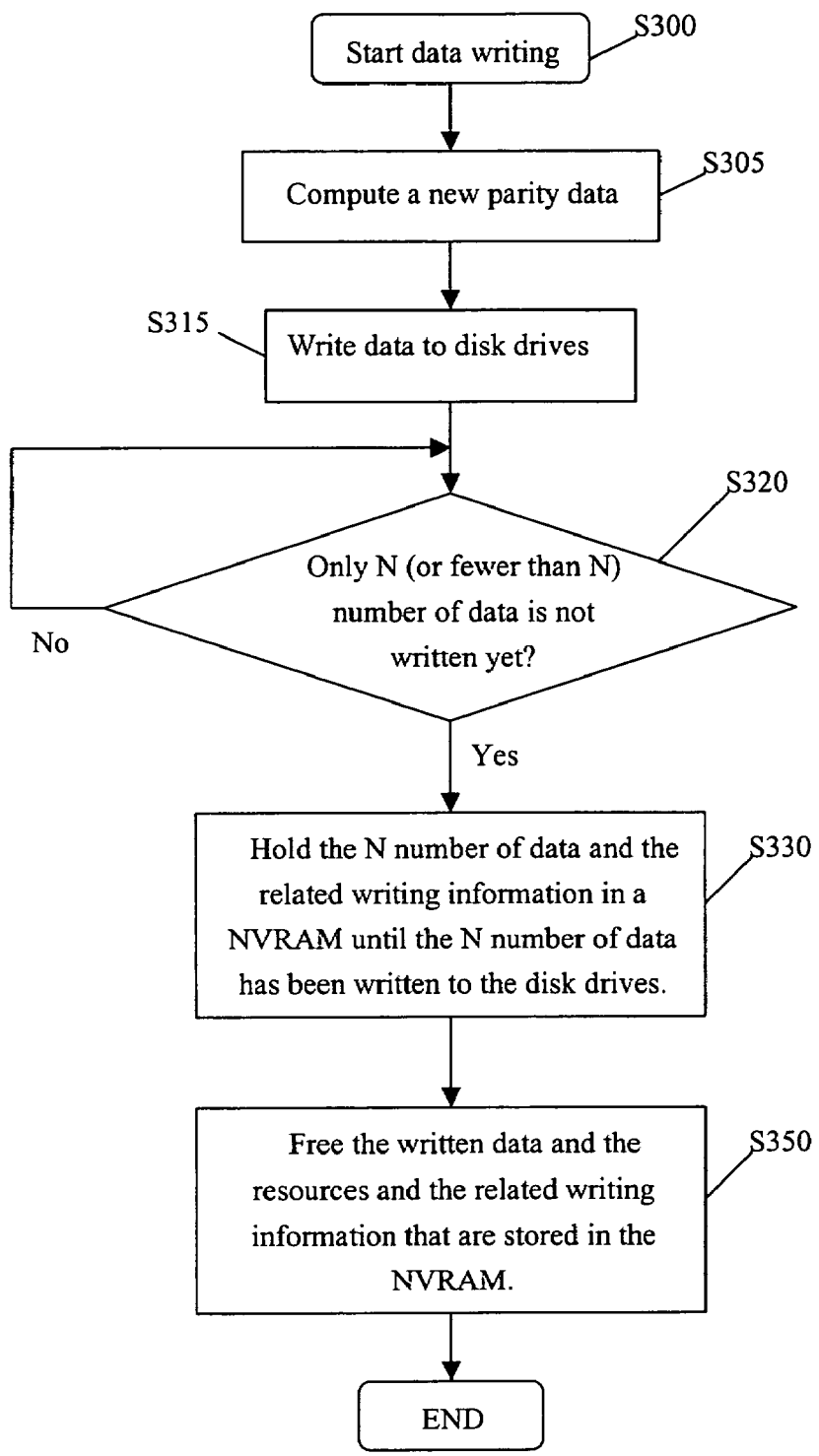
FIG. 3A is an action flowchart according to an embodiment of the invention.

FIG. 3A shows an action flowchart according to an embodiment of the invention. The procedure in this embodiment is used between the NVRAM 2212 of the controller 221 and the physical disk drive array 222. The data sent from the application I/O request unit 21 can be processed in a write-through or write-back mode. However, in either the write-through or write-back mode, the data received from an upper-layer device (e.g., the application I/O request unit 21) are usually stored temporarily in the NVRAM 2212. After the storing process is done, the data are going to be written into the storage medium from the NVRAM 2212. Therefore, the invention can be applied while writing data from the NVRAM 2212 to the storage medium.

Please refer to FIG. 3A together with FIG. 2. Suppose that the RAID type of the system is RAID 5 and data W1', W2', W3' are going to be written into a stripe across the storage media D5, D6, D7 from the NVRAM 2212 (as shown in FIG. 4B). Before writing, the controller 221 first calculates a new parity data P1' of the stripe 41 to be written with the data, and store the new parity data P1' in the NVRAM 2212 (step S305). However, the new parity data P1' can be stored in another memory in another embodiment. Afterwards, the controller 221 writes the data W1', W2', W3' and the parity data P1' from the NVRAM 2212 to the disk drives D5, D6, D7, and D8, respectively (step S315). After the controller 221 writes the data into the target disks drives D5, D6, D7, and D8, it determines whether there is only, or fewer than, a predetermined N number of data left and yet written to the target disk drives D5, D6, D7, and D8 (step S320). If there is more than N number of data yet written, the controller 221 will keep waiting for the data to be written to the target disk drives until there is only, or fewer than, N number of data left. For example, if N=1 and only the data W2' is yet written, the controller 221 will consider the data writing I/O request issued by the application I/O request unit 21 as completed and reply a writing completion message to the application I/O request unit 21. Then, the controller 221 marks those data stored in the NVRAM 2212 that have been actually written into the target disk drives (e.g., the data W1', W3', P1') as completed (further, those data can be utilized while read caching) or release the storage space in the memory 2212 for subsequent I/O processing and the corresponding resources are then also released. For example, the stripe is unlocked and allowed for other I/O requests to access (step S350).

It should be noted that at the time there is actually N number of data (e.g., the data W2') yet to be written to the disk drives (e.g., D6). The N number of yet written data and their related writing information are kept storing in the NVRAM 2212 until the writing process is completed (step S330).

The related writing information of the yet written data mentioned above, which is stored in the NVRAM 2212, comprises a writing address. Taking advantage of the characteristic of NVRAM capable of temporarily keeping data when a power cut or power failure happens, the yet written data can be prevented from being lost so that the data writing process can be resumed thereby after the power is turned back on.

However, in another embodiment, the yet written data may not be stored in the NVRAM owing to considering cost or other factors. When the writing completion judgment condition is satisfied (such as the above-mentioned only, or fewer than, N number of data yet written), the controller 221 replies a writing completion message to the application I/O request unit 21 beforehand in order to achieve a better writing efficiency. However, when being applied in a RAID system having check data, the yet written data is still stored in a volatile memory and the parity updating log is separately stored in a NVRAM with smaller capacity. If a power cut or power failure happens at the time, the data in the stripe will be inconsistent because of the yet written data, and then a consistent correction is performed in light of the parity updating log. In another embodiment, the parity updating log may not separately stored in the NVRAM with smaller capacity, so the consistent correction is needed to be performed upon all data in the stripe after the power is turned back on.

In another embodiment, a step of storing the parity updating log is further performed after computing the new parity data. Moreover, in step S350, the parity updating log is further released (e.g., deleted) so as to enhance the entire system efficiency.

The above-mentioned embodiment involves only one parity data (P) (e.g., RAID 3~5). If the RAID type used in the disclosed system supports a plurality of parity data (e.g., RAID 6 with two parity data P and Q in each stripe), then step S305 should calculate the corresponding plurality of new parity data. If the adopted RAID type does not have parity data (e.g., RAID 0 with no check data), then steps of S305 can be omitted.

In one embodiment, the setting of N value of data is decided by the adopted RAID type (or RAID level). For example, N=1 if one of RAID 3 to 5 is adopted. This utilizes the characteristic that the kind of RAID system supports one parity data (P). Therefore, when the system has problems, the yet written data can be restored or rebuilt by the data in the other disk drives.

In another embodiment, the setting of the above-mentioned N number of data is based upon the waiting time (T) that the storage system can tolerate for temporary inaccessibility to storage media, where T=memory size/(system efficiency/ number of effective disk drives). For example, suppose that the system efficiency is capable of dealing with data of 200 MB/sec and the storage system is running in a RAED 5 configuration consisting of (8.1) disk drives, in which 8 disk drives are effective disk drives so that each disk drive thereof shares 25 MB of data processing loading per second. If the NVRAM 2212 has a size of 512 MB and N is set to be 1, it means that the controller 221 can regard the data writing I/O request to the stripe as completed and reply a writing completion message to the application I/O request unit 21 when only one set of data is not written yet, and the corresponding resources can be released ahead. If one of the disk drives temporarily cannot complete a data writing process, then 25 MB of uncompleted I/O data are accumulated each second in the NVRAM 2212. 500 MB uncompleted I/O data will be accumulated after 20 seconds. Therefore, if the target disk drive completes the data writing process in 20 seconds, the system will not have any delay. If the target disk drive completes the data writing process for 21 seconds, the accumulated uncompleted I/O data will exceed the capacity of the NVRAM 2212, resulting in one second of delay to the system.

Likewise, if N=2, the data writing I/O request will be regarded as completed when only two sets of data are uncompleted, and the tolerable waiting time of the storage system is then to be 10 seconds. Therefore, the determination of the value of N has to take into account the operating environment factors such as the system efficiency, the number of disk drives, the size of memory, etc. Of course, in other embodiments of the invention, the value of N can be determined via other methods.

In the previous embodiments, a N value is set to be the writing completion judgment condition that the controller considers ahead the data writing I/O request as completed. Namely, when there is only (or fewer than) N number of data yet written in the system, a writing completion message is replied in advance to the application I/O request unit 21 and the data writing I/O request from the application I/O request unit 21 is regarded as completed. Moreover, the written data, which are previously stored in the NVRAM 2212 and have been written to the target disk drives, are marked as completed (further, those data can be utilized while read caching), and the storage space in the memory 2212 is released for subsequent I/O processing, and the corresponding resources are then also released. For example, the stripe is unlocked and allowed for other I/O requests to access, and the yet written data and the related writing information are still kept in the NVRAM 2212 until the writing process completed. In another embodiment, the writing completion judgment condition can be about a time period. When the predetermined specific time period is attained, the controller 221 will regards the data writing I/O request from the application I/O request unit 21 as completed no matter how many data sets are not written yet, and replies a writing completion message to the application I/O request unit 21.

Figure 3B:
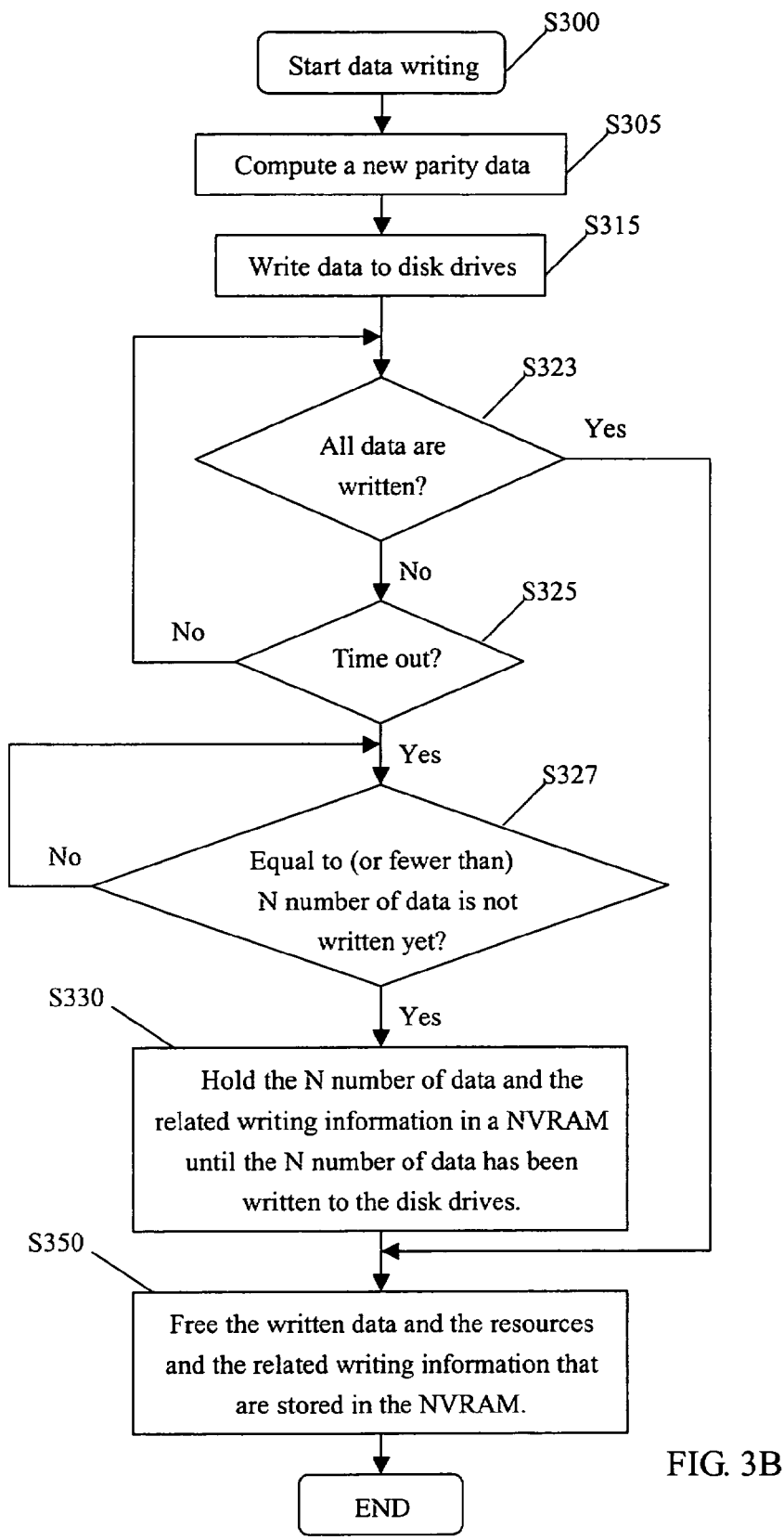
FIG. 3B is an action flowchart according to an embodiment of the invention.

In another embodiment of the invention, the writing completion judgment condition can be the combination of the above-mentioned two parameters (N value and a specific time period). With reference to FIG. 3B which depicts one of implementation examples of the embodiment, before a predetermined time period comes, the system checks whether writing completion messages of all the target disk drives for the data are received; namely, as shown in step S323, the system checks whether all the data are completely written.

Then, the system is waiting and determines whether a predetermined specific time period is attained or not (step S325). If some data are not yet written after the predetermined time period, the system checks whether there is fewer than or equal to N number of data yet written (step S327). If so, the controller 221, as the above description, removes the writing information of the data that are completely written to the corresponding target disk drives, considers the data writing I/O request as completed, and releases the corresponding resources.

Figure 3C:
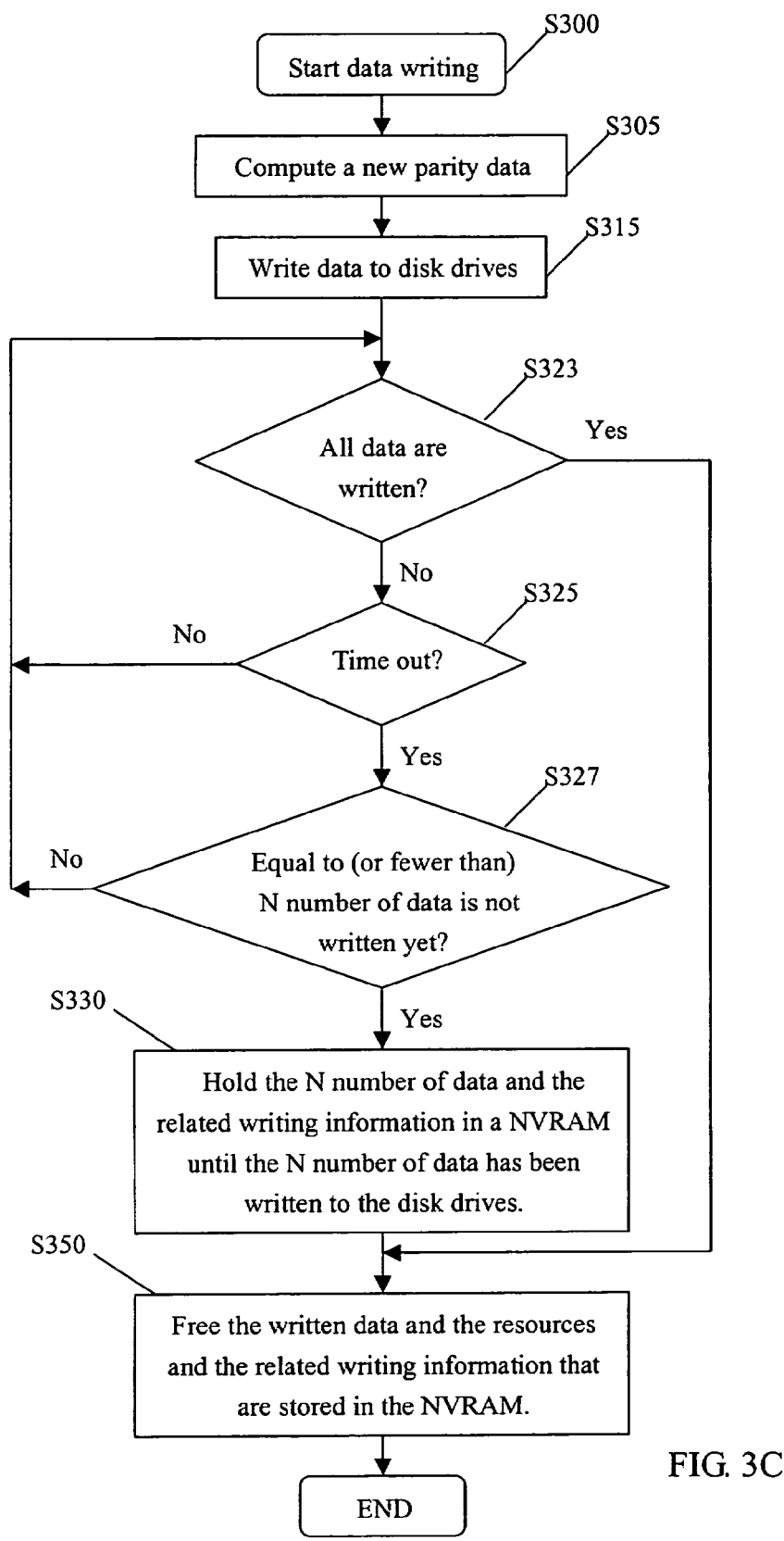
FIG. 3C is an action flowchart according to an embodiment of the invention.

The design in the embodiment of FIG. 3B is when a predetermined time period is passed after the controller 221 sends physical storage medium write requests to the target disk drives, will the writing completion judgment condition be examined then. In this embodiment the system will be waiting until the number of uncompleted data sets is equal to or fewer than N after the predetermined time period is attained. However, it does not mean the invention restricted within such means. For example, in another embodiment as shown in FIG. 3C the system returns to step S323 if the number of uncompleted data sets is greater than N after a first predetermined time period attained; namely, the timing is to restart again (FIG. 3C).

In an embodiment of the invention, the related writing information, including the writing address of the written data, is stored together with the corresponding written data into the NVRAM before writing into the target disk drive. Once the system is turned back on from a power cut or power failure, the writing action can be resumed by reading the data stored in the NVRAM, thereby preventing the situation such as data loss or writing errors. Therefore, in this embodiment, there is probably no need to adopt the means of storing a parity updating log.

In one embodiment, the related writing information of each written data set stored in the NVRAM 2212 further includes a writing status and a writing address, so that the yet written data can be distinguished from the other data stored in the NVRAM 2212 by means of the writing status. For example, when the writing status is set as "0", it means the corresponding data needn't be written anymore for the data may have been written. When the writing status is set as "1", it means the corresponding data need to be written, probably waiting to be written or are being written. Of course, in other embodiments, various writing statuses of the data can be further classified to have more status marks. For example, the data to be written and the data being currently written are distinguished by different marks, and/or the data that have been written and the data that do not need to be written are distinguished by different marks. A person skilled in the art can readily implement the related marking means and the implementation does not restrained by the mentioned examples.

Figure 4A:
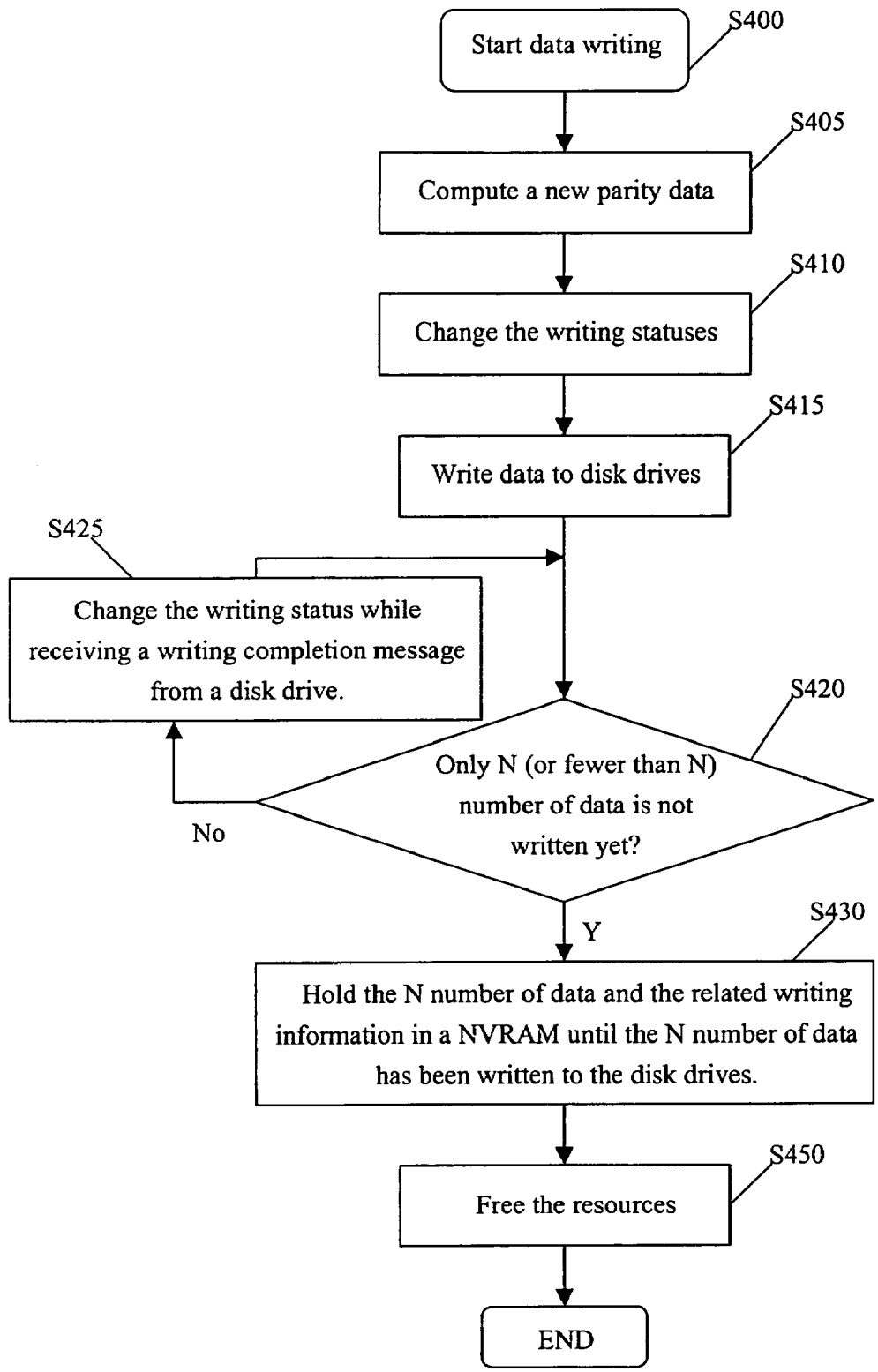
FIG. 4A is an action flowchart according to an embodiment of the invention.
Figure 4B:
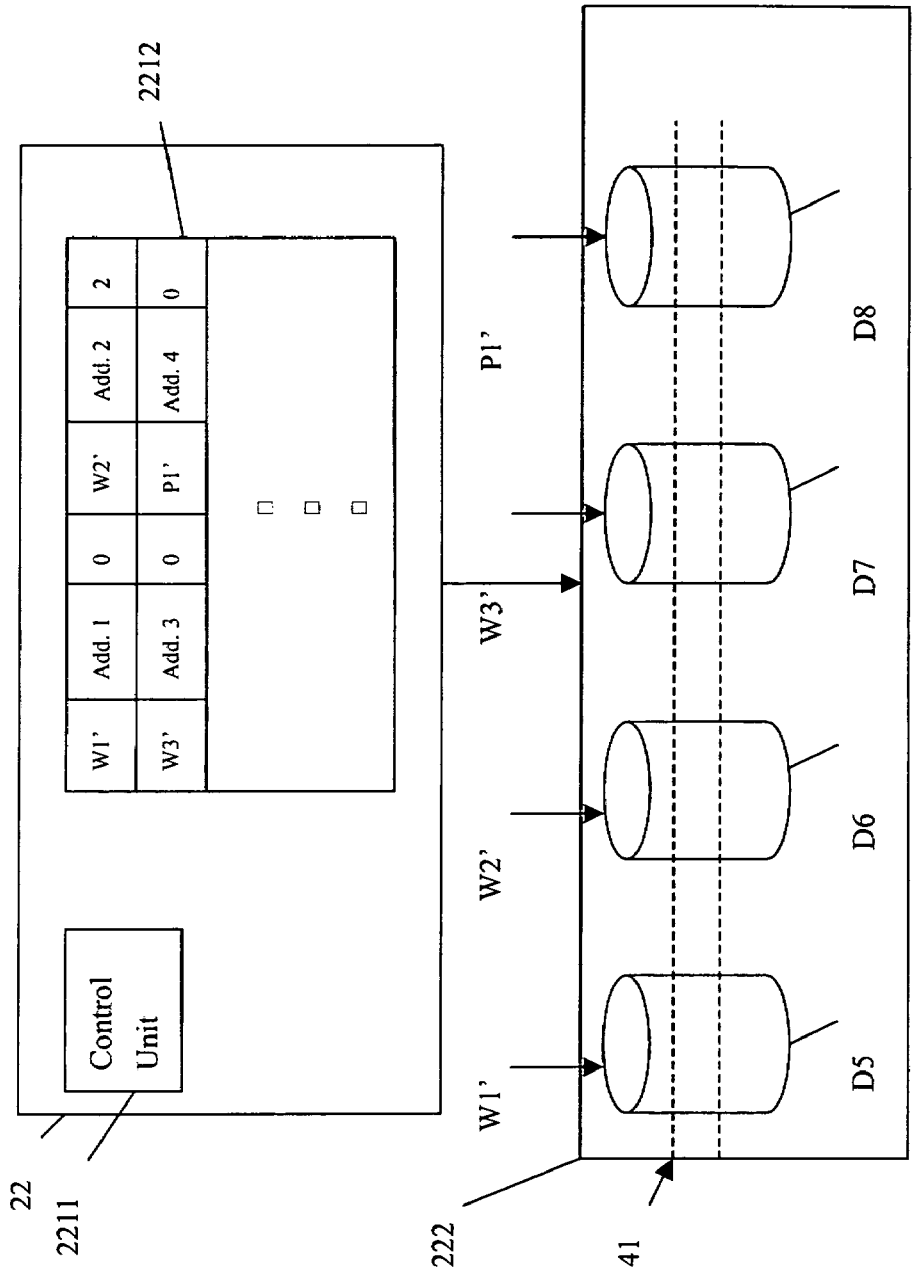
FIG. 4B is a schematic structural view according to an embodiment of the invention.

FIG. 4A is a flowchart showing a disposition of one of the embodiments mentioned above. For convenient description, the following scheme is adopted. The writing status "0" indicates that the corresponding data have been written and can be used for caching. The writing status "1" indicates that the corresponding data are to be written. The writing status "2" indicates that the corresponding data are currently being written.

The flowchart in this embodiment is the same as the previous embodiments, capable of being implemented between the NVRAM 2212 of the controller 221 and the physical disk drive array 222. The data to be written and the related writing information as received from the upper layer device (e.g., the application I/O request unit 21) are temporarily stored in the NVRAM 2212. However, in addition to the temporarily stored data, the writing information also includes the corresponding writing address and writing status of the data in this embodiment. Meanwhile, the written data are not yet written from the NVRAM 2212 to the storage medium, so the writing status of the related writing information is set as "1".

Please refer to FIG. 4A and FIG. 4B together. Taking RAID 5 as an example, when data W1', W2', W3' are about to be written from the NVRAM 2212 to the storage media D5, D6, D7, the controller 221 also first calculates a new parity data P1' of the stripe 41 to be written before writing and stores the new parity data P1' and the related writing information (including the writing status and writing address) into the NVRAM 2212 (step S405). Afterwards, the controller 221 changes the writing statuses of the written data to "2" (step S410). And then, data W1', W2', W3' and the parity data P1' are written to the disk drives D5, D6, D7 and D8 from the NVRAM 2212, respectively (step S415).

After the controller 221 writes data to the target disk drives D5, D6, D7, and D8, it determines whether there is equal to, or fewer than, predetermined N number of data yet written to the target disk drives D5, D6, D7, and D8 (step S420). The number of data yet written can be learned by counting the writing completion messages received from the disk drives. At the same time while receiving a writing completion message from a disk drive, the controller will change the corresponding writing status of the written data to "0" (step S425). Following that, the controller 221 immediately releases the storage space corresponding to the writing status of "0", so that the storage space can be used for subsequent I/O operations. For example, as shown in FIG. 4B, data W1', W3', P1' have been written and their corresponding writing statuses are changed to "0".

If there is more than N number of data yet written, the controller 221 continues waiting for the data to be written into the target disk drives until only, or fewer than, N number of data left uncompleted. Suppose that there is fewer than or equal to N number of data yet written, as the example shown in FIG. 4B, assuming that N=1 and only data W2' is not written yet. In this situation, the controller 221 regards the data writing I/O request to the stripe as completed and releases the corresponding resources. For example, the additional memory required for writing to the stripe is released except for the space for writing data W2', and other I/Os are then allowed to access the stripe (step S450). Likewise, the parity updating log is released (or deleted) if any. Please note that at this moment there is N number of data (e.g., data W2') not yet written into the disk drive (e.g., D6). Therefore, the writing statuses of the N number of yet written data are remained as "2", while the writing action is still on-going and the statuses will be changed to "0" when the writing completion messages are received (step S430).

Suppose that a power cut or power failure happens when data W2' are being written into a disk drive. Data W2' and the related writing information do not disappear since they are stored in the NVRAM 2212 in advance. After the controller 221 is rebooted, it directly checks writing statuses of the data stored in the NVRAM 2212 to see which ones are set as "2". As the example shown in FIG. 4B, data W2' are in the status of yet written completely and it will be rewritten to the target disk drive according to the writing status "2" and the corresponding writing address and the written data. This ensures that the data being written will not be lost because of a power cut or power failure. Furthermore, once data W2' are rewritten, the parity data of the stripe will keep in consistency with other data in the same stripe. Therefore, the parity data do not need to be calculated again by using the parity updating log for consistency corrections of the stripe.

For those data that are about to be written, they and their related writing information are stored in the NVRAM 2212, so the data and information will not be lost even when a power cut or power failure happens. Therefore, after the controller reboots, operations stopped by the power cut or power failure can be resumed and the writing processes are continuously performed in order according to the writing statuses (set as "1") to understand which written data are waiting for being written to the target disk drives.

In this embodiment, the writing status of data is directly used to understand the writing situation thereof. When the system meets a power cut or power failure situation, it uses the writing status and writing address to return or resume the writing action. Therefore, there is no need to store a parity updating log. However, it does not imply to eliminate the parity updating log from being involved in the invention.

For the controller, as the writing status "0" indicates that a writing completion message has been received from the target disk drive, meaning that the data are written to completion. Therefore, the corresponding data storage space can be released for subsequent I/O operations. That is, once a writing sub-process is completed, its corresponding storage space can be released for use without waiting until all the writing operation is done. Some storage systems implement RAID functions with check data, such as RAID 1 with mirror data, RAID 5 with one parity data set, and RAID 6 with two or more parity data sets, etc. For this kind of RAID storage systems, one important function is that when at least one disk drive fails, the system can recover or rebuild the data therein by using data in other disk drives according to the RAID level adopted.

Therefore, when writing data into a block of a disk drive, the check data associated with the block has to be updated simultaneously in order to maintain the consistency of the parity data of the stripe. As the example shown in the previous embodiment, when writing data to a stripe, the new parity data of the stripe has to be calculated first and updated at the same time while performing data writing.

Hence, to this kind of storage systems, processing a write request actually implies that many data sets need to be written to different disk drives for a corresponding stripe (at least including the written data and the check data). However, the writing status change completion time of the plurality of data before writing may not be the same. However, If a power cut or power failure happens during the change process, the writing statuses of the plurality of written data stored in the memory corresponding to the stripe for the write request may be inconsistent. For example, the writing statuses of some of the written data corresponding to an identical stripe may have been changed to show the status as being written, whereas the others may not be completely changed and the status is still waiting to be written. Therefore, after resuming the power supply, if the controller only writes those data, whose statuses have been changed, into the target disk drives directly according to the writing statuses, it will incur the inconsistency of the parity data of the stripe.

In one embodiment of the invention, there is a change record designed to record the address of the stripe in which the writing statuses of the data are being changed before the change is completed.

Figure 4C:
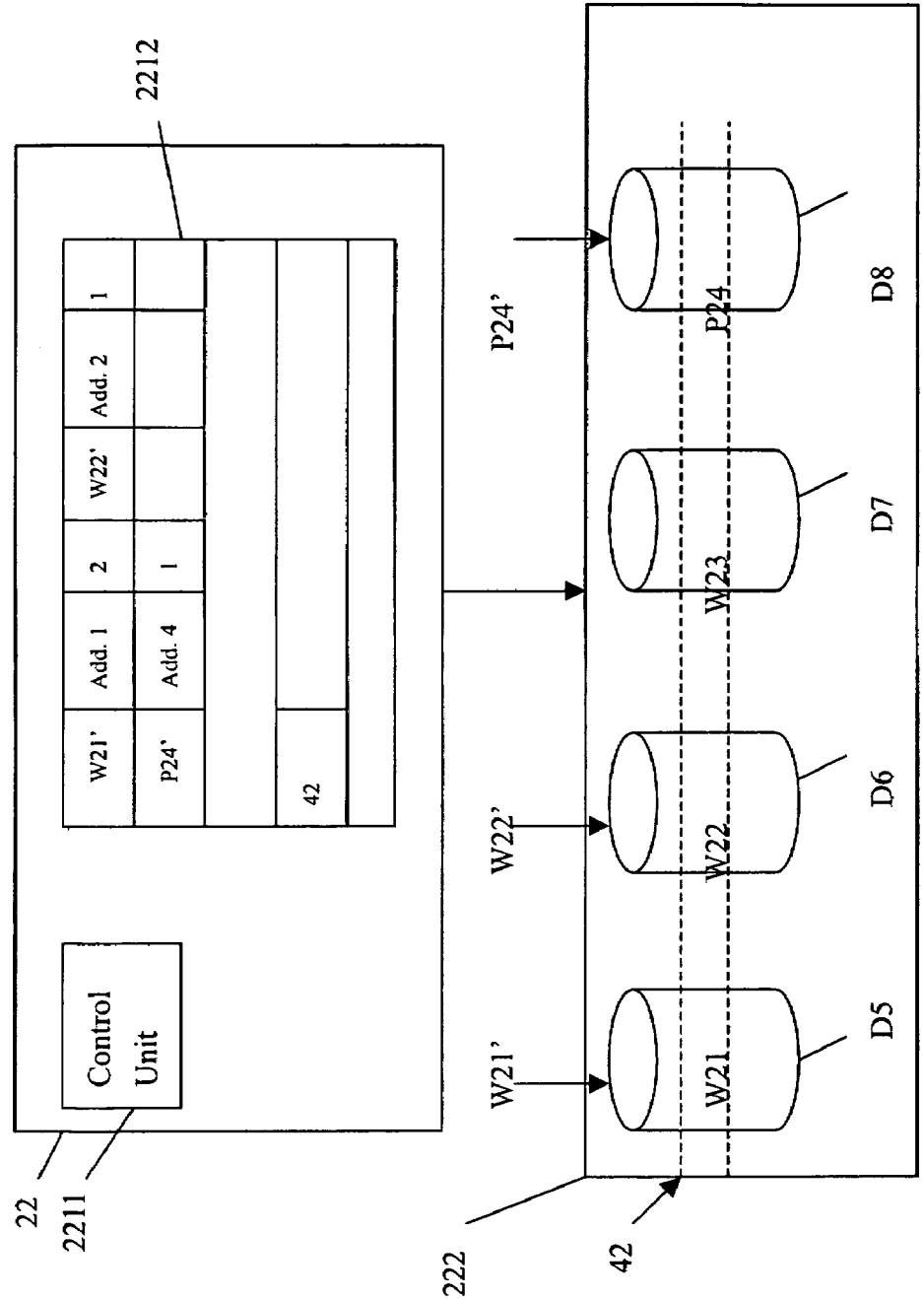
FIG. 4C is a schematic structural view according to an embodiment of the invention.

Referring to FIG. 4C again, it takes RAID 5 as an example. Assuming that, for the stripe 42, data W21, W22, W23, and P24 are already stored in the disk drives D5, D6, D7, and D8, respectively. In theory, the parity data should be consistent, namely P24=W21.W22.W23. The controller analyzes a data writing I/O request and then intends to write data W21', W22' to disk drives D5, D6 of the stripe 42, respectively. The new parity data P24' of the stripe 42 is first calculated (P24'=W21'.W22'.W23=W21'.W22'.W21.W22.P24). In this embodiment, before writing into the target disk drives, the address of the stripe 42 is recorded while or before the writing statuses of data W21', W22', and P24' are changed until the changes are all done.

Assuming that a power cut or power failure unfortunately happens while changing the statuses, and in the meantime only the writing status of W21' is changed to 2 while the ones of W22', P24' are still 1. After the power supply is resumed, if the controller only writes W21', whose writing status is 2, into the target disk drive according to the data stored in the memory 2212, then the parity data of the stripe 42 will be inconsistent. This is because the parity data in the disk drive D8 is not updated, which is still P24, but P24.W21'.W22.W23. However, in this embodiment of the invention, in addition to writing W21' into the disk drive D5, the change record is also checked to learn that the stripe 42 was performing a writing status change for the related written data while a power cut or power failure happens. Therefore, the controller will perform a consistent correction to the parity data of the stripe 42 at the same time.

Or, in other embodiments, after the power supply is resumed, the controller checks the record to learn that the stripe 42 was performing a writing status change while a power cut or power failure happens. The controller will not write the written data W21', corresponding to the stripe 42 and with the writing status of 2, into the target disk drive D5 but reprocess the write request corresponding to the stripe 42 instead. Likewise, in other previously mentioned embodiments implementing with writing statuses, a specific time period is set. Only after sending out I/O requests to the target disk drives for the specific time period, will the controller 221 check the writing statuses and determine whether there is fewer than or equal to the predetermined N number of data yet written.

Figure 5A:
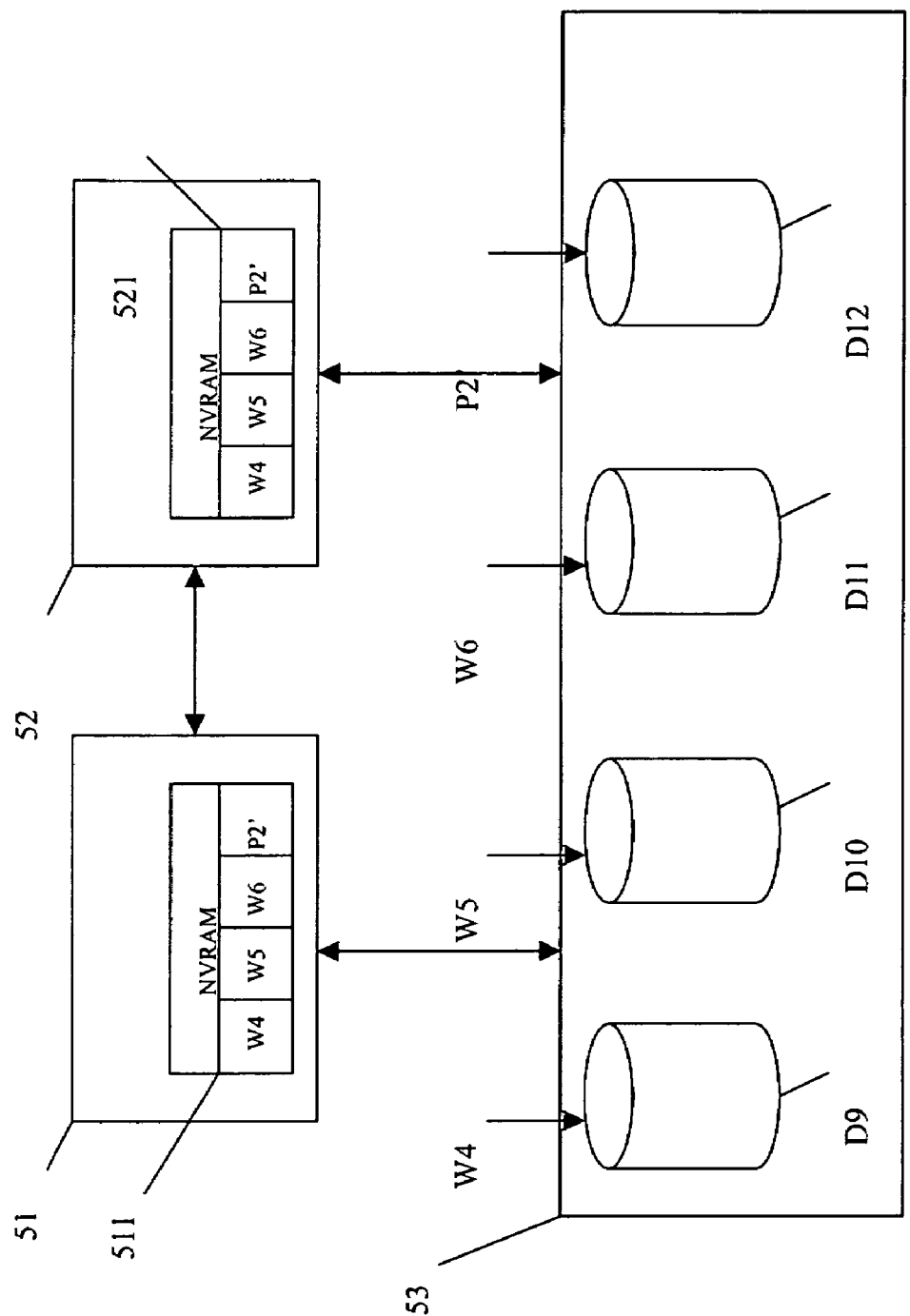
FIG. 5A is a schematic view of the redundant structure according to an embodiment of the invention.

FIG. 5A shows another embodiment of the invention, which depicts a redundant structure capable of operating as an active-active mode or an active-standby mode. In FIG. 5A, the structure includes controllers 51, 52 and a physical disk drive array 53. The controller 51 has a NVRAM 511, and the controller 52 has a NVRAM 521. The physical disk drive array 53 has disk drives D9, D10, D11, and D12.

Assuming that the active-standby mode is adopted in the redundant structure and the controller 51 is set to be the primary controller while the controller 52 is a secondary controller. The data stored in the NRAM 511 of the controller 51 are copied to the NVRAM 521 of the controller 52 to prevent the data from being lost if the controller 51 fails while the controller 52 can immediately takes over the unfinished jobs. In this embodiment, the NVRAM 511 of the controller 51 stores data W4, W5, and W6, which are also stored in the NVRAM 521 of the controller 52.

When the controller 51 writes data W4, W5, and W6 stored in the NVRAM 511 into the disk drives D9, D10, and D11 of the physical disk drive array 53, the operations are similar to those embodiments mentioned above. However, when the controller 51 adds or updates the data stored in the NVRAM 511, it will also notify the other controller 52 so that the data stored in both the NVRAMs 511 and 521 of the two controllers 51 and 52 can be maintained almost synchronous and consistent. For example, before the controller 51 writes data W4, W5, W6 to the disk drives, the new parity data P2' is re-calculated and stored in the NVRAM 511 with the related writing information. Meanwhile, the data P2' and the related writing information are also copied to the NVRAM 521 of the controller 52. Or, if implemented with writing statuses, the controller 52 will be notified to update the data in the memory 521 to do the corresponding change when the writing statuses are changed. Or, if there are change records applied, the controller 52 will also be notified to update the records in the memory 521 to have the same data.

Accordingly, when the controller 51 fails, the controller 52 can check the data stored in the NVRAM 521 and perform corresponding processes. Such processes include, for example, re-writing valid data in the NVRAM 521 into the target disk drives referring to the writing address; re-writing the data with a writing status of "2" to avoid data from being lost and scheduling the writing processes of the data with a writing status of "1" for continuing the jobs of the controller 51; or preventing the situation of inconsistent parity data according to the change record.

Figure 5B:
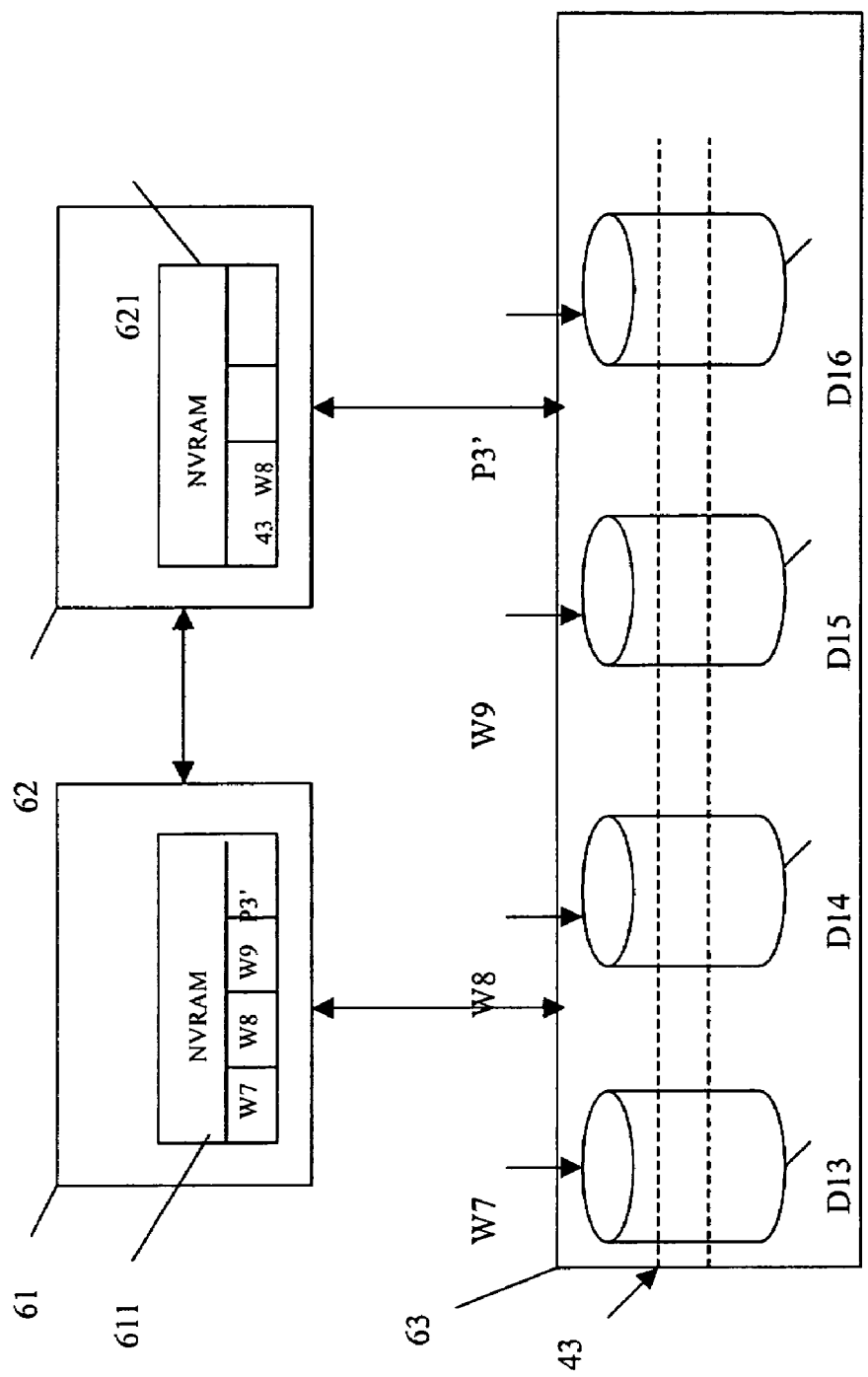
FIG. 5B is a schematic view of the redundant structure according to an embodiment of the invention.

FIG. 5B shows the schematic view of a redundant structure of another embodiment of the invention. Similar to the above-mentioned embodiment, the structure includes controllers 61, 62 and a physical disk drive array 63 in FIG. 5B. The controller 61 has a NVRAM 611. The controller 62 has a NVRAM 621. The physical disk drive array 63 has disk drives D13, D14, D15, and D16.

This embodiment is generally applicable to the write-through mode. Its difference from the above-mentioned embodiment is as follows. When the controller 61 receives the write request and the related written data from the upper layer device, they are stored in the NVRAM 611 but not copied to the NVRAM 621 of the controller 62. Only when the controller 61 is going to write data to the target disk drives, will the controller 62 be notified which parity data or stripe is being written with data so as to allow the controller 62 to use this record to maintain the consistency of the parity data once the controller 62 takes over the writing job. This is because the write-through mode is adopted, and it is not very necessary to copy data to the other controller. For the write-through mode means that before the data are actually written to the target disk drive, the upper layer device that sends out the request will not receive any writing completion message. Therefore, even if the controller 61 fails before the writing process is completed and the controller 62 does not have the corresponding data when it takes over the job, the upper layer device, sending out the write request, can send the write request again to the controller 62 when it detects errors or finds timeout.

Take another example for further explanation as follows. When data W7, W8, and W9 stored in the NVRAM 611 are written by the controller 61 into the disk drives D13, D14, and D15 of the physical disk drive array 63, the operation is similar to the above-mentioned embodiments. However, the related memory update induced by this action is not transmitted to the controller 62, but, at this moment, the controller 61 notifies the controller 62 that the stripe 43 is currently being written with data. Afterwards, when there is N number of data (e.g. data W8) left with no completion responses, the controller 61 will copy the N number of uncompleted data (e.g. data W8) and the related writing information into the NVRAM 621 of the controller 62, as shown in FIG. 5B. Then, the controller 61 sends a writing completion message to reply the upper layer device. When the controller 61 receives the writing completion response of data W8 from the target disk drive, it not only releases the storage space storing data W8 and the related information in the NVRAM 611 but also notifies the controller 62 to release the storage space storing the backup of data W8 in its NVRAM 621.

Therefore, when the controller 61 fails, the controller 62 can check the NVRAM 621 to see which data stored inside are valid and which stripe is being written with data. The controller 62 then re-writes those data being written but yet completed into the target disk drives, or performs a parity data consistency correction.

Figure 5C:
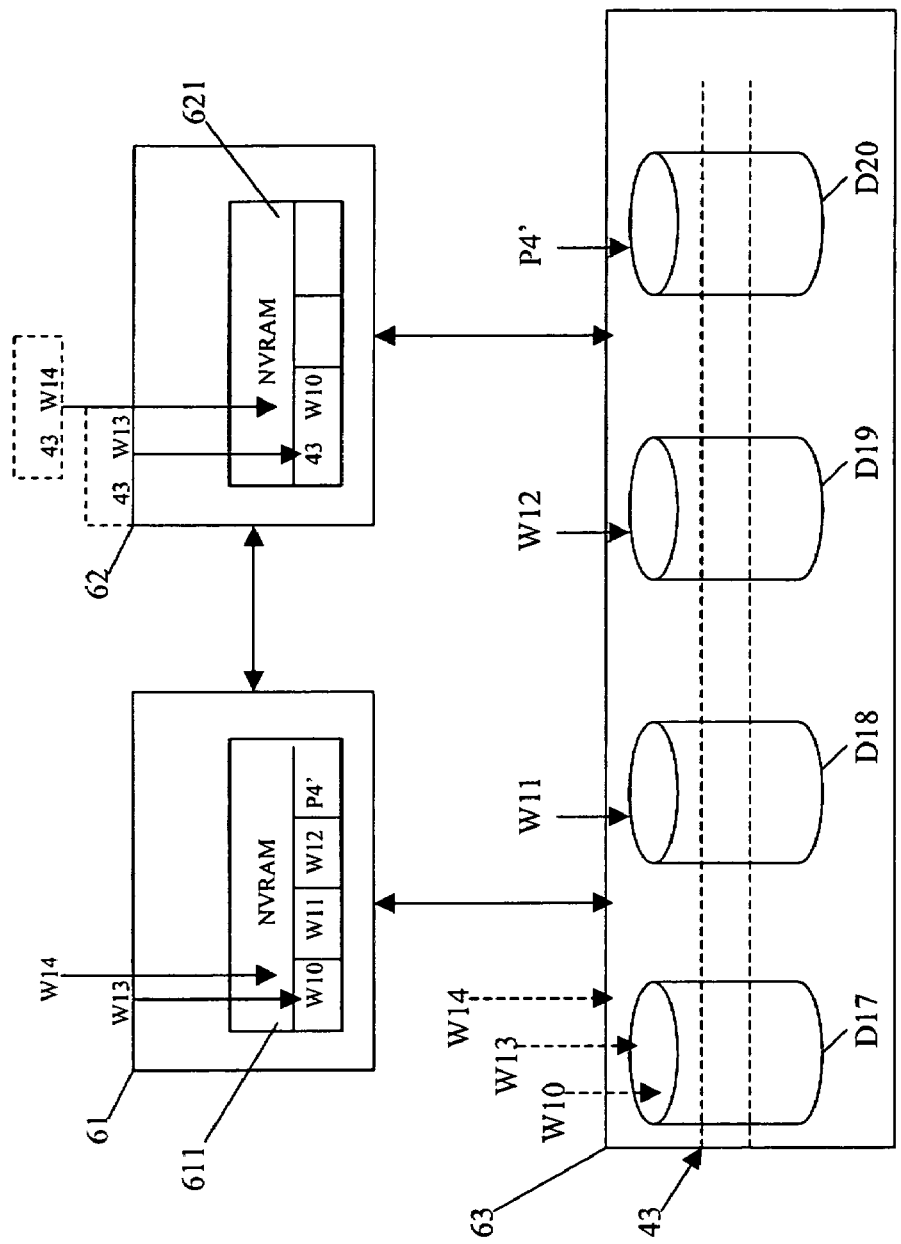
FIG. 5C is a schematic view of the redundant structure according to an embodiment of the invention.

Moreover, referring to FIG. 5C, in the invention, assuming that when the controller writes data W10, W11, and W12 and the corresponding parity data P4' from the NVRAM to the target disk drives D17, D18, and D19, D20, respectively, data W11, W12, and P4' have been successfully written into the target disk drives D18, D19, and D20. If setting N=1, then there is only the predetermined N number of data uncompleted. Therefore, the corresponding resources are released ahead, but data W10 and the corresponding writing address are still stored in the NVRAM.

However, in some cases, even though data W10 is uncompleted yet, the upper layer device (such as the application I/O request unit 21) may send another write request again. This write request includes writing a new data W13 to the target disk drive D17 in the address the same as the one of data W10. Namely, data W13 will cover data W10. In one embodiment of the invention, when the controller performs the step of writing data W13 into the target disk drive D17, the step further abandons (e.g., deletes, considers invalid, or changes the writing status to "0") data W10 and the related writing information stored in the NVRAM. Based on this design, when data W13 are being written and the controller meets the situation of a power cut or power failure, data W13 will be re-written according to the data stored in the NVRAM once the power supply is resumed and data W10 will not be re-written in order to avoid unnecessary writing actions. It also prevents the system from doing incorrect writing orders (writing data W13 first and then data W10) when the power supply is resumed.

In yet another embodiment, in order to avoid an incorrect order of re-writing data to the same address, each set of data can be marked with a counting value. For example, the counting value of data W10 is 1 and the counting value of data W13 is 2, so the system can determine which data are the latest by the counting values. Therefore, when the system encounters an abnormal situation and has to enter a re-writing procedure, the controller can check the counting values and re-writes only the latest data.

In another embodiment of the invention, before the controller writes data W13 into the target disk drive, it will send a command to the target disk drive D17 for aborting the writing process for data W10 and then performs the procedure for writing data W13. Only after receiving the aborted completion message, does the controller release the previous data W10 and the related writing information stored in the memory.

Moreover, if the system does not support the function of aborting write requests which are already sent to the target disk drive, in another embodiment the same address will not be assigned a new data writing command until the writing completion message of data W10 is received from the target disk drive D17. Namely, data W13 will not be written to the target disk drive before the writing completion message of data W10 is received. While waiting for the completion message returned, assuming that the upper layer device, similar to the above description, sends a new write request to the controller for writing data W14 to the same address with data W10, W13 in the target disk drive D17. In this embodiment, as described above, the controller can only keep data W14 and abandon data W13, or taking advantage of the means of attaching a counting value as described above, data W14 can be marked with a counting value of 3. Similarly, if there are still other data going to be written to the same address while the controller is waiting for the writing completion response, only the latest data will be kept and the other older one(s) in the same address will be abandoned; or alternatively, the counting value is accumulated in order to identify which are the latest data. When the writing completion message of data W10 is received, only the existing valid data or the data corresponding to the largest counting value are needed to be written to the target disk drive.

That is to say, in the previous two embodiments, older data or the data with a smaller counting value for being stored in the same address will be abandoned during the waiting period. Namely, those data will not be really written. This can effectively reduce the number of writing actions.

It should be noted that either one or both of the above-mentioned methods of abandoning older data and using counting values to distinguish old and new data can be adopted in practice.

Figure 6:
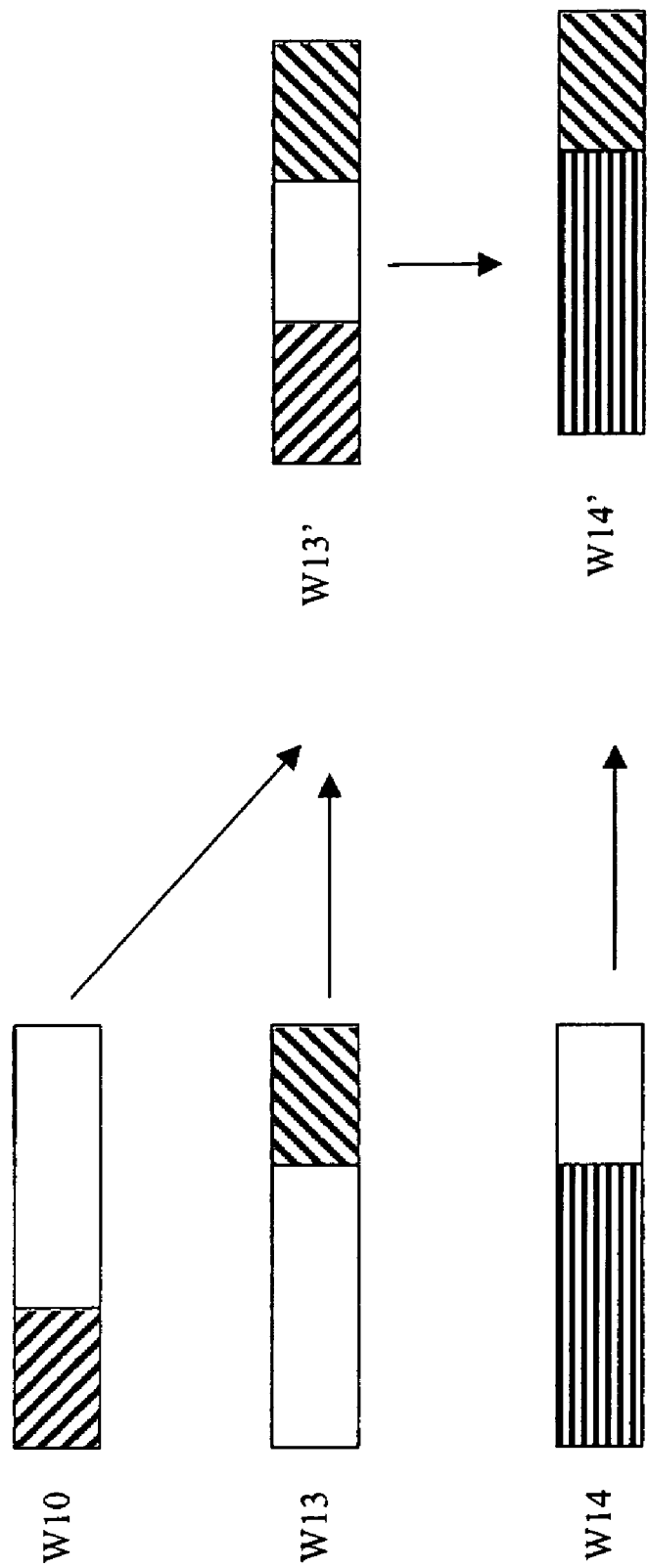
FIG. 6 is a schematic view of the integrated data writing method of the invention.

Furthermore, in some system designs, one possible writing situation is that each set of written data may not involve the entire data of the target storage block. For example, as shown in FIG. 6, data W10 contains only the data to be written in the front sector of the block A of the target disk drive D17, and data W13 contains the one to be written in the rear sector thereof. In this case, if only the latest data are written as described in the previous embodiment, data loss or data errors may be incurred. Therefore, in another embodiment that adopts the counting values, the counting values are simply used to determine the order of the written data in order to avoid the same address from being written in a wrong order. Namely, only when something abnormal happens to the system and a re-writing procedure is required, can the controller re-write the data in order according to the counting values, instead of only re-writing the latest data (the one with the largest counting value).

However, in one embodiment of the invention, latest received data and existed yet written old data for being written to the same address are integrated, so that the actions of writing data to the target disk drives can be effectively minimized while ensuring the integrity and correctness of the written data. For example, with reference to FIG. 6 again, assuming that when data W10 are yet written completely, data W13 are received. Data W13 and W10 will be integrated to be data W13'. Likewise, if data W14 to be written into the same block A are further received, then data W13' and W14 will be further integrated to be W14'. Once the response is received or the power supply is resumed, only the latset integrated data W14' will be written because it is not completely written yet.

According to the above description, the invention considers the data writing I/O request as completed when only predetermined N number of data are yet written from a NVRAM to a physical storage device. Then, the storage space of the NVRAM associated with the written data and the related writing information whose writing completion message is already received from the physical storage device is released for other operations, and the corresponding resources are released, so as to improve the overall system efficiency.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for writing data in a storage system, which is performed by a first controller in order to deal with a data writing I/O request issued by an application I/O request unit, the method comprising:
   sending at least one physical storage medium write request to a physical storage medium array;
   examining whether a writing completion judgment condition is satisfied or not; and
   regarding the data writing I/O request as completed and releasing resources corresponding to the completed one(s) of the at least one physical storage medium write request and resources used by the data writing I/O request if the previous examining result is yes;
   wherein, written data and related writing information of the uncompleted one(s) of the at least one physical storage medium write request are stored in a memory and will be deleted after the uncompleted one(s) of the at least one physical storage medium write request is(are) completed.

2. The method of claim 1, wherein the writing completion judgment condition is about a specific time period, and the data writing I/O request is regarded as completed when the specific time period is attained.

3. The method of claim 1, wherein the writing completion judgment condition is about a predetermined number, and the data writing I/O request is regarded as completed when a number of the uncompleted one(s) of the at least one physical storage medium write request is not larger than the predetermined number.

4. The method of claim 3, wherein the predetermined number is determined by concerning an adopted RAID type.

5. The method of claim 3, wherein the predetermined number is determined by concerning a waiting time that the storage system can tolerate temporary inaccessibility to storage media, and the waiting time is determined by the factors including a memory size, system efficiency, and a number of effective disk drives.

6. The method of claim 3, wherein after the step of sending the at least one physical storage medium write request, the method further comprising a clocking step for counting time until a predetermined time period is attained and then performing the examining step, and the examining step may not need to be performed if the at least one physical storage medium write request is all completed before the predetermined time period is attained.

7. The method of claim 1, wherein further releasing storage space corresponding to the completed one(s) of the at least one physical storage medium write request to be provided for the use of latter I/O operations.

8. The method of claim 1, wherein the step of releasing the resources including unlocking a locked stripe owing to the data writing I/O request and allowing other I/O operations to access the stripe.

9. The method of claim 1, wherein the memory has a characteristic that can keep its stored data alive even when a power cut or power failure happens, so that the written data and the related writing information of the uncompleted one(s) of the at least one physical storage medium write request can stay keeping in the memory until the write request is actually completed.

10. The method of claim 9, wherein the related writing information of the uncompleted one(s) of the at least one physical storage medium write request, stored in the memory, includes a writing address which is provided for rewriting data to the physical storage medium array after power supply is resumed if a power cut or power failure happens.

11. The method of claim 1, wherein before sending the at least one physical storage medium write request, the method further comprising the steps as follows:
- receiving the data writing I/O request and the corresponding written data from the application I/O request unit;
- storing the written data from the application I/O request unit into the memory; and
- performing the step of sending the at least one physical storage medium write request to the physical storage medium array for responding to the data writing I/O request from the application I/O request unit in order to writing the written data into the physical storage medium array.

12. The method of claim 11, wherein the related writing information comprises a writing status mark which is provided for distinguishing writing statuses of the corresponding written data.

13. The method of claim 12, wherein further comprising:
- the writing status mark indicates the writing status to be waiting for being written when receiving the written data from the application I/O request unit and storing the written data in the memory;
- the writing status mark is varied to show the status of the written data as currently being written before performing the step of sending the at least one physical storage medium write request to the physical storage medium array for responding to the data writing I/O request from the application I/O request unit; and
- the writing status mark corresponding to the written data whose physical storage medium write request is completed is varied to show the writing status as completed.

14. The method of claim 13, wherein further comprising a change record which records the address of a stripe corresponding to the written data whose writing status is being changed to be being written.

15. The method of claim 14, wherein further comprising:
- rewriting the written data in the memory into the physical storage medium array according to the corresponding writing status mark showing the status as being written after power supply is resumed if a power cut or power failure happens; and
- performing a consistent correction to a parity data of the stripe according to the change record.

16. The method of claim 14, wherein, according to the change record, reprocessing the data writing I/O request corresponding to the stripe recorded after power supply is resumed if a power cut or power failure happens.

17. The method of claim 1, wherein before the step of sending the at least one physical storage medium write request, the method further comprising:
- issuing an aborting command to at least one physical storage medium of a target written address corresponding to the at least one physical storage medium write request in order to abort a write request which is already existed and being performed in the at least one physical storage medium; and
- abandoning the data and the related writing information which are already stored in the memory and have the same target written address with the at least one physical storage medium write request.

18. The method of claim 1, wherein before the step of sending the at least one physical storage medium write request, the method further comprising: abandoning the data and the related writing information which are stored in the memory and have the same target written address with the at least one physical storage medium write request and correspond to no write request having been issued.

19. The method of claim 1, wherein each the written data, stored in the memory and corresponding to and not yet completely written to the same target written address, has a counting value used to show the sequences of a plurality of data corresponding to the same target written address.

20. The method of claim 1, wherein before the step of sending the at least one physical storage medium write request, the method further comprising the step of integrating a plurality of the written data stored in the memory and having the same target written address with the at least one physical storage medium write request.

21. The method of claim 1, wherein further storing the written data and the related writing information of the uncompleted one(s) of the at least one physical storage medium write request into a memory of a second controller, so that the second controller can take over and continue completing the writing action once the first controller fails.

22. The method of claim 1, wherein when the writing completion judgment condition is examined to be satisfied, further storing the written data and the related writing information of the uncompleted one(s) of the at least one physical storage medium write request into a memory of a second controller, so that the second controller can take over and continue completing the writing action once the first controller fails.

23. The method of claim 1, wherein further copying an address of a stripe corresponding to the data writing I/O request from the first controller to a second controller and temporarily storing the address in a memory therein, so that the second controller can perform a consistent correction to a parity data of the stripe according to the temporarily-stored address when the first controller fails and the second controller takes over its jobs.

24. A storage system, comprising:
- an application I/O request unit used to issue a data writing I/O request;
- a first controller coupled to the application I/O request unit; and
- at least one physical storage medium array coupled to the first controller and used to provide storage space to the application I/O request unit through the first controller;
- wherein the first controller sending at least one physical storage medium write request to the physical storage medium array owing to the data writing I/O request, regarding the data writing I/O request as completed when a writing completion judgment condition is satisfied, storing written data and related writing information of the uncompleted one(s) of the at least one physical storage medium write request in a memory, and releasing resources corresponding to the completed one(s) of the at least one physical storage medium write request and resources used by the data writing I/O request.

25. The system of claim 24, wherein the memory has a characteristic that can keep its stored data alive even when a power cut or power failure happens, so that the written data and the related writing information of the uncompleted one(s) of the at least one physical storage medium write request can stay keeping in the memory until the write request is actually completed.

26. The system of claim 25, wherein the memory is selected from a group comprising a non-volatile memory (NVRAM) and a memory with a battery backup unit.

27. The system of claim 24, wherein the writing completion judgment condition is about a specific time period, and the data writing I/O request is regarded as completed when the specific time period is attained.

28. The system of claim 24, wherein the writing completion judgment condition is about a predetermined number, and the data writing I/O request is regarded as completed when the number of the uncompleted one(s) of the at least one physical storage medium write request is not larger than the predetermined number.

29. The system of claim 24, wherein further comprising a second controller which comprises a memory storing the written data and the related writing information of the uncompleted one(s) of the at least one physical storage medium write request, so that the second controller can take over and continue completing the writing action once the first controller fails.

30. The system of claim 24, wherein further comprising that the first controller examines the writing completion judgment condition, and when the writing completion judgment condition is satisfied, the written data and the related writing information of the uncompleted one(s) of the at least one physical storage medium write request are copied and stored into a memory of a second controller, so that the second controller can take over and continue completing the writing action once the first controller fails.

31. A storage subsystem, comprising:
   a first controller; and
   at least one physical storage medium array coupled to the first controller;
   wherein when the first controller sends at least one physical storage medium write request to the physical storage medium array and a writing completion judgment condition is satisfied, a data writing I/O request from an application I/O request unit is regarded as completed, and then written data and related writing information of the uncompleted one(s) of the at least one physical storage medium write request are stored in a memory, and resources corresponding to the completed one(s) of the at least one physical storage medium write request and resources used by the data writing I/O request both are released.

32. The subsystem of claim 31, wherein the memory has a characteristic that can keep its stored data alive even when a power cut or power failure happens, so that the written data and the related writing information of the uncompleted one(s) of the at least one physical storage medium write request can stay keeping in the memory until the write request is actually completed.

33. The subsystem of claim 31, wherein the memory is selected from a group comprising a non-volatile memory (NVRAM) and a memory with a battery backup unit.

34. The subsystem of claim 31, wherein the writing completion judgment condition is about a specific time period, and the data writing I/O request is regarded as completed when the specific time period is attained.

35. The subsystem of claim 31, wherein the writing completion judgment condition is about a predetermined number, and the data writing I/O request is regarded as completed when a number of the uncompleted one(s) of the at least one physical storage medium write request is not larger than the predetermined number.

36. The subsystem of claim 31, wherein further comprising a second controller which comprises a memory storing the written data and the related writing information of the uncompleted one(s) of the at least one physical storage medium write request, so that the second controller can take over and continue completing the writing action once the first controller fails.

37. The subsystem of claim 31, wherein further comprising that the first controller examines the writing completion judgment condition, and when the writing completion judgment condition is satisfied, the written data and the related writing information of the uncompleted one(s) of the at least one physical storage medium write request are copied and stored into a memory of a second controller, so that the second controller can take over and continue completing the writing action once the first controller fails.

* * * * *